UNITED STATES PATENT OFFICE.

FREDERIC H. SNYDER, OF JERSEY CITY, NEW JERSEY, ASSIGNOR TO THOMAS HYSLOP, OF NEW YORK, N. Y.

IMPROVEMENT IN PREPARING SAW-DUST FOR USE IN THE ARTS.

Specification forming part of Letters Patent No. 138,821, dated May 13, 1873; application filed February 14, 1873.

*To all whom it may concern:*

Be it known that I, FREDERIC H. SNYDER, of Jersey City, Hudson county, in the State of New Jersey, have invented a new and useful Improvement in the Manner of Preparing Saw-Dust for Transportation as an article of commerce, and for the prevention of its ignition accidentally while in transitu; and I do hereby declare that the following is a full, clear, and exact description thereof, which will enable others skilled in the art to make and use the same, reference being had to the following full and complete specification and description of my invention.

It is well known that, on account of the high rates of insurance prevailing in large cities, fixed upon risks upon manufacturers using wood-working machinery in which saw-dust is produced, that such establishments have, to a large extent, been removed to rural districts, necessitating its transportation in cars, vessels, or wagons, for long distances, while the demand for saw-dust (always a trade of no mean extent) has steadily increased, until, from the cost and difficulty of transporting it on account of its great bulk, the loss of packages, and the danger of its getting on fire from sparks or otherwise has raised its market price to such an extent as to seriously interfere with the success of those industries using it in large or small quantities.

The invention alluded to above is intended to reduce the cost of packages, of freight transportation, handling, storage, and danger of fire, and thus to enable consumers of saw-dust to procure it at a much lower price than has been possible for a long time past.

My method of preparing saw-dust is as follows: I use for compressing it any suitable press that will form bales of the desired size—either screw, lever, or hydraulic presses may be used. The presses should be made light and portable, of the following dimensions: five feet long by one foot six inches in width; and so constructed that when it is run down there will be a space of two feet between the beams, which would form a bale five feet long, two feet wide, and one foot six inches in thickness. Dry saw-dust may be reduced to one-twelfth ($\frac{1}{12}$) of its original bulk, and bales of the above dimensions should weigh from four to five hundred pounds; but, if desired, any different-sized bale may be formed, either smaller or larger. After the bales are pressed to the desired form, they should be covered with incombustible cloth or burlaps sewed together or bound with straps.

I am aware that cotton, hay, and similar articles have been baled for storage, transportation, &c., and that no novelty exists in the mode of baling, or the presses used; these, therefore, I do not claim; but packages or bales of compressed saw-dust are not now articles of commerce, and are desirable as a medium for packing, &c., in the trades and arts; therefore

What I claim as my invention, and desire to secure by Letters Patent, is—

As an article of trade, a block or bale of compressed saw-dust incased in a wrapper of burlaps or other suitable material.

FREDERIC H. SNYDER.

Witnesses:
  WM. H. WOOD,
  B. S. HOPKINS.